UNITED STATES PATENT OFFICE.

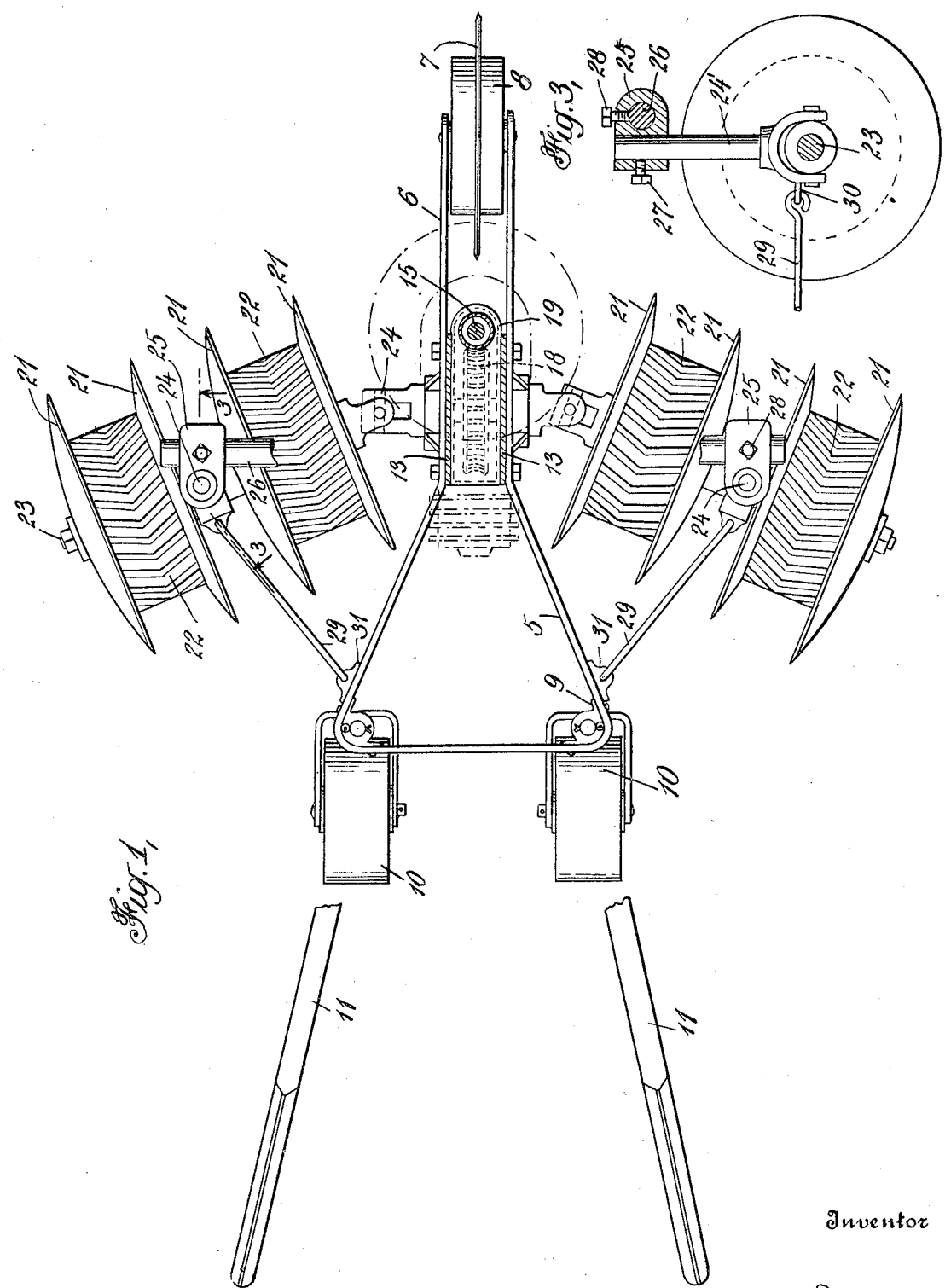

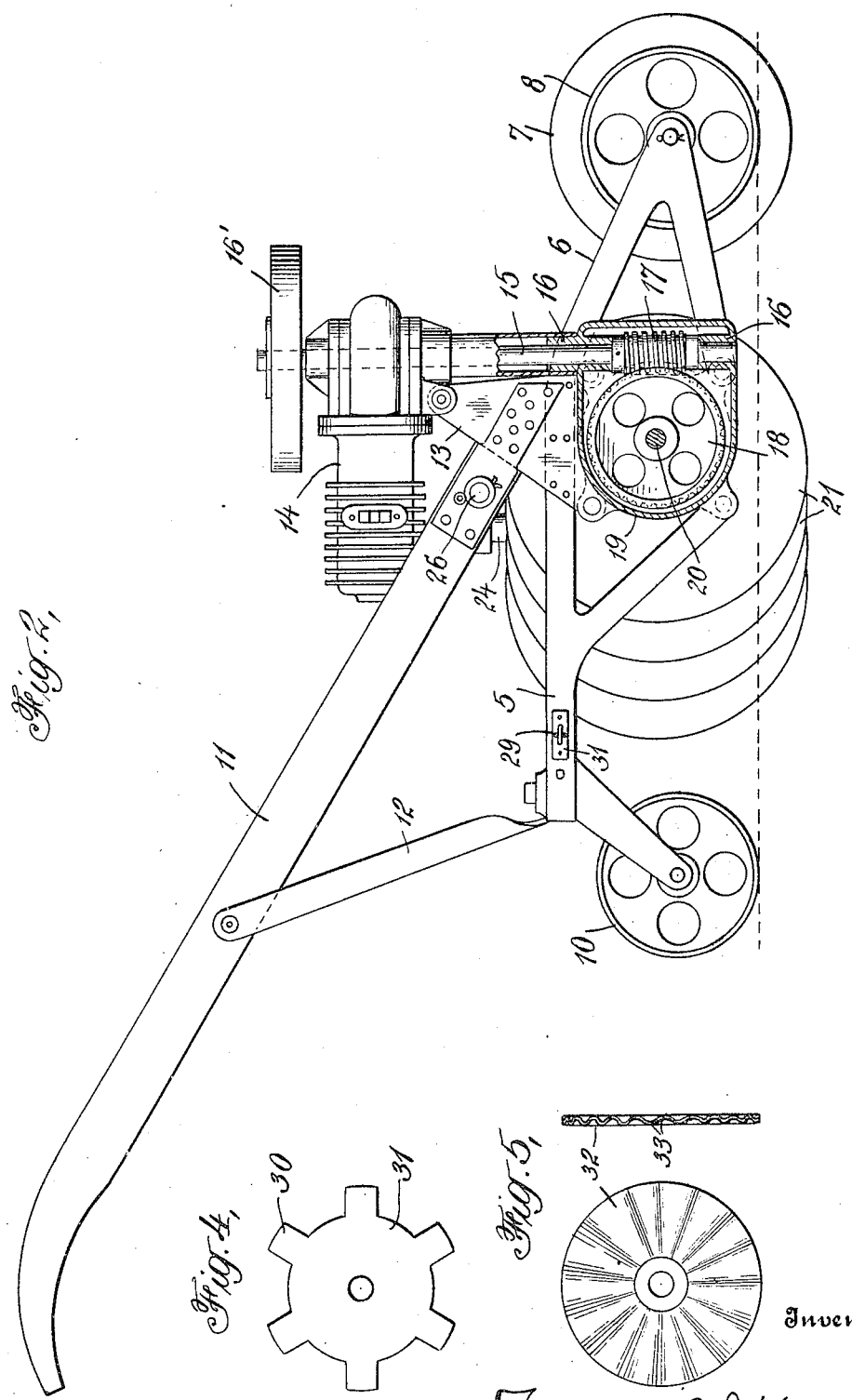

FERDINAND C. DITTMAR, OF DAVENPORT, IOWA.

CULTIVATOR.

1,419,722.  Specification of Letters Patent.  Patented June 13, 1922.

Application filed November 28, 1919. Serial No. 341,157.

*To all whom it may concern:*

Be it known that I, FERDINAND C. DITTMAR, a citizen of the United States, residing at Davenport, in the county of Scott, State of Iowa, have invented certain new and useful Improvements in Cultivators; and I do hereby declare the following to be a full, clear, and exact description of the invention, such as will enable others skilled in the art to which it appertains to make and use the same.

This invention relates to agricultural cultivators and has for its primary object the provision of a power driven cultivator of simple and inexpensive construction, and adapted to a wide variety of uses.

More particularly, my invention relates to the provision of a cultivator having combined traction and cultivation devices to which power is applied directly to cause the cultivator to advance and at the same time to work the surface over which it passes.

Further objects and advantages of the invention reside in the various combinations as hereinafter described and claimed, as will be apparent by reference to the specification, when read in connection with the accompanying drawing illustrating the preferred embodiment of the invention, in which—

Fig. 1 is a plan section of a cultivator constructed in accordance with my invention;

Fig. 2 is a vertical section through the cultivator;

Fig. 3 is a detail in section on the line 3—3 of Fig. 1; and

Figs. 4 and 5 are details in elevation of cultivating devices adapted to be employed.

Agricultural cultivators have, for many years, required the use of draught animals and more recently tractors have been employed in connection with such devices. Tractors are, however, as at present known and used, entirely unadapted for use in fields of growing plants, and their use has been limited because of the size and weight to the preliminary preparation of the ground. The present invention contemplates the provision of a power driven cultivator which is suitable for use in fields with growing plants, and which solves a difficulty long experienced in the handling of cultivators by means of draught animals. The cultivator is, for example, extremely compact so that it may be used between rows of growing plants. It is, moreover, comparatively light in weight so that it does not compress the earth. It is relatively inexpensive in first cost, and up-keep and requires no attention between the periods when it is in active use.

The invention depends fundamentally upon the idea of applying the power of a suitable prime mover directly to combined traction and cultivating devices. In this manner the power is most effectively employed, the necessary weight of the structure is reduced and a thorough and satisfactory cultivation is assured. Preferably, the cultivating devices take the form of discs similar to those employed in the ordinary disc cultivator. These discs may be plain and the space between may provide traction means to insure advance of the cultivator. On the other hand, the discs may be toothed or fluted so that they form in themselves traction means in which event the spaces between the discs may be filled by plain rollers to prevent the discs from sinking too deeply into the earth. Any type of prime mover, which is adapted for the purpose, may be employed, but preferably an internal combustion engine, capable of providing the necessary power, is supported on the frame with the cultivator and directly connected to the traction means.

Referring to the drawing, 5 indicates a frame, roughly triangular in form, and having a forwardly projecting portion 6, the latter portion providing journals for a coulter 7, comprising a plain disc having flanges 8 which prevent the disc from cutting too deeply into the earth. At the rear angles of the frame 5, I provide brackets 9 in which caster wheels 10 are pivotally supported. Thus the frame is suspended at three points and may be advanced over a surface, the pivoted caster wheels permitting guiding as the frame advances. A pair of handles 11 are secured to the frame adjacent the apex of the triangular portion and are supported by braces 12, thus forming a rigid construction and permitting the operator to direct the apparatus as required.

Supported on a suitable bracket 13 above the frame 5 is a prime mover 14, preferably an internal combustion engine, adapted to burn liquid fuel, for example, the engine being provided with the usual accessories of such apparatus. The engine is, in the modification illustrated in the drawing, horizontally arranged so that the shaft 15 thereof carrying a fly-wheel 16' extends vertically, and is supported in suitable bearings 16 in the frame. The shaft 15 carries, near its lower end, a worm 17, which meshes with a worm-wheel 18 preferably disposed in a suitable gear case 19. The gear case 19 also encloses the worm 17 and shaft 15, to prevent access of dirt to the working mechanism, the gear case being supported on the frame 5.

The worm-wheel 18 is secured to a horizontal shaft 20 projecting through suitable bearings at both sides of the gear case 19. While not essential to the operation of the mechanism and the accomplishment of the desired purpose, a differential may be provided on the shaft 20 to perform the common function of such a device in a motor driven vehicle. A suitable clutch may, moreover, be interposed at any point between the engine 14 and the traction devices.

The combined traction and cultivating devices as illustrated in the drawing, comprise discs 21 and intermediate fillers 22, the latter being preferably provided with teeth 23 to insure traction. The discs 21 and fillers 22 are fixed on shafts 23, each of which is connected to one of the free ends of the shaft 20 by Cardan or universal joints 24. The shafts 23 are supported in yokes 24' which are in turn adjustably mounted in brackets 25, the latter being adjustably supported on a cross-bar 26 disposed between handles 11 adjacent the frame 5. Screws 27 and 28 are provided to permit adjustment of the yokes 24' and brackets 25 respectively, thus permitting bodily adjustment of the shafts 23 and the discs thereon with respect to the frame. The shafts 23 are disposed in angular relation with respect to the longitudinal axis of the frame and are held in adjusted position by links 29 engaging brackets 30 and 31 on the yokes 24' and frame 5 respectively. By removing the links 29 and substituting longer or shorter lengths, the angular relation of the shafts 23 with respect to the longitudinal axis of the frame may be varied.

As illustrated in Fig. 1 of the drawing, the tractive effort is applied through the fillers 22 between the discs and when the cultivator is in operation, it is advanced while the rotating discs shift the earth toward the axis of the cultivator. By simply removing and reversing the discs on the respective shafts 23, the cultivator may be made to shift the earth away from the axis. Thus, as illustrated in the drawing, the cultivator may be driven through a new field of corn for weeding and when it becomes necessary to hill the corn, the discs may be reversed and the earth moved toward the rows of corn between which the cultivator passes. By varying the angular relation of the shafts 23 to the axis of the cultivator, any desired draw may be given to the discs. The flanges 8 on the coulter 7 and the fillers 22 between the disc prevent the cultivator from cutting too deeply into the earth. The discs may be readily lifted from engagement with the earth by tilting the cultivator on the caster wheels 10, the engine remaining in operation. If a clutch is employed the engine may be started without lifting the discs from the earth.

In Figs. 4 and 5 of the drawing, I have illustrated slightly different forms of disc, teeth 30 being provided, for example, on the discs 31 which are otherwise identical with the plain discs illustrated in Fig. 1 of the drawing. Discs 32 may be employed, the discs being as fluted at 33. The latter forms of discs are adapted to serve both as tractors and cultivating devices and in using such discs it is not essential to employ the teeth 23 as hereinbefore described.

The discs, regardless of their form, may be employed in any suitable relation and they may, by simple modification be mounted in tandem. Obviously any additional implements may be readily connected to the cultivator to drag or roll thereafter and thereby finish the cultivation, if further movement of the earth is required. By employing an arch, such as is commonly used in one or two row cultivators, my present invention may be extended to provide a cultivator adapted to straddle one or more rows of plants in the ordinary manner instead of working between the rows as in the present modification. The details of such a structure form no part of my present invention but I wish to point out some of the adaptations of my invention in order that it may be clearly understood that I claim broadly the application of power directly to combined traction and cultivating devices in agricultural implements.

From the foregoing it will be apparent that I have perfected a novel and useful cultivator which may be used for a variety of purposes. It is well adapted, for example, for the cultivation of corn and is particularly desirable for use in orchards to eliminate weeds and provide a suitable mulch. The operator, having no horse to guide, may devote his attention entirely to the work of the cultivator and thus greatly improved results are obtained by relatively unskilled persons in handling work of this character.

Various changes may obviously be made in the form, arrangement and construction of the parts without departing from the invention or sacrificing any of the advantages thereof.

I claim:

1. In a cultivator, the combination of power means, and a plurality of cultivating discs actuated by said power means and having means associated therewith adapted to limit the depth of cultivation and to drive said cultivator.

2. In a cultivator, the combination of power means, and a plurality of cultivating discs and interposed fillers, said discs and fillers being actuated by said power means to drive said cultivator.

3. In a cultivator, the combination of power means, a pair of shafts driven thereby, cultivating devices and interposed traction means on said shafts and rotating therewith to drive said cultivator when said shafts are actuated by said power means.

4. In a cultivator, the combination of a frame, power means thereon, a pair of shafts driven thereby and a plurality of discs and associated fillers on said shafts to limit the depth of cultivation and to drive said cultivator.

5. In a cultivator, the combination of a frame, power means thereon, cultivating devices and interposed traction means actuated by said power means to drive said cultivator, and means connected to said frame for guiding said cultivator.

6. In a cultivator, the combination of a frame, means for supporting said frame, power means thereon, a pair of shafts operatively connected to said power means, a plurality of cultivating discs and interposed fillers secured to each of said shafts.

7. In a cultivator, the combination of a frame, means for supporting said frame, power means thereon, a pair of shafts operatively connected to said power means, a plurality of cultivating discs and interposed fillers secured to said shafts, and means permitting adjustment of said shafts with respect to said frame.

8. In a cultivator, the combination of a frame, means for supporting said frame, power means thereon, a pair of shafts operatively connected to said power means, a plurality of cultivating discs and interposed fillers on said shafts and means for guiding said cultivator.

9. In a cultivator, the combination of power means and a plurality of notched cultivating discs and interposed fillers, said discs and fillers being actuated by said means to drive said cultivator.

10. In a cultivator, the combination of power means and a plurality of corrugated cultivating discs and fillers interposed between said discs, the discs and fillers being actuated by said power means to drive said cultivator.

11. In a cultivator, the combination of a frame, an internal combustion engine supported thereon, a pair of shafts operatively connected to the engine and adapted to be driven thereby, a plurality of cultivating discs and interposed fillers arranged on each shaft to rotate therewith and thereby advance the cultivator, and means connected to the frame for manually guiding the cultivator.

12. In a cultivator, the combination of a frame, an internal combustion engine supported thereon, a pair of shafts operatively connected to the engine and adapted to be driven thereby, and combined cultivator and tractor means arranged on each shaft to rotate therewith, including a plurality of discs and interposed fillers.

In testimony whereof I affix my signature.

FERDINAND C. DITTMAR.